Dec. 12, 1933.　　　C. F. MILLER ET AL　　　1,939,310
COMBINED AWNING AND SHUTTER
Filed March 23, 1929　　　3 Sheets-Sheet 1

Inventors
Charles F. Miller
Seth N. Brundage
By
Attorney

Dec. 12, 1933.  C. F. MILLER ET AL  1,939,310
COMBINED AWNING AND SHUTTER
Filed March 23, 1929  3 Sheets-Sheet 2

Inventors
Charles F. Miller
Seth M. Brundage
By
Attorney

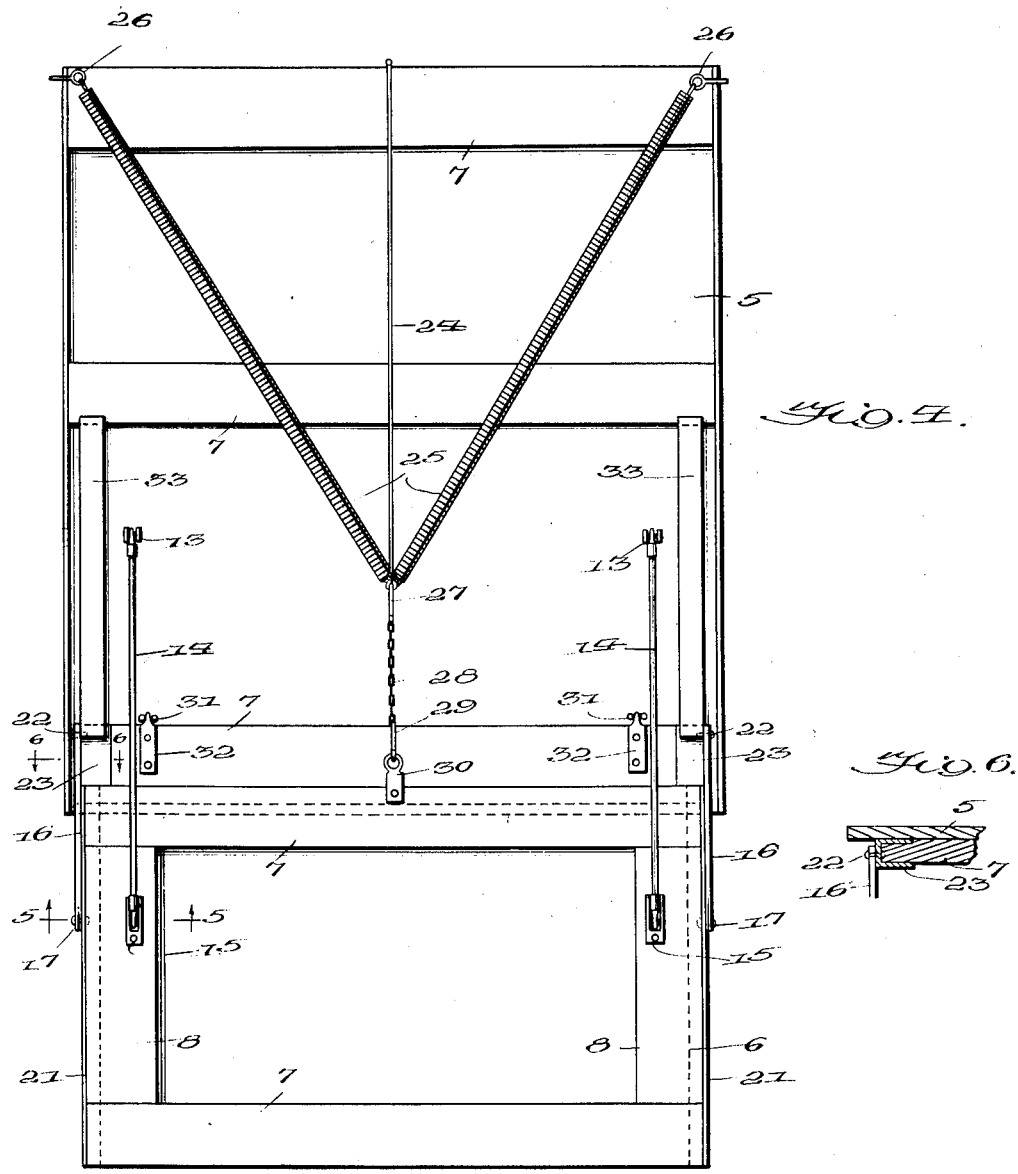
Fig. 4.
Fig. 6.
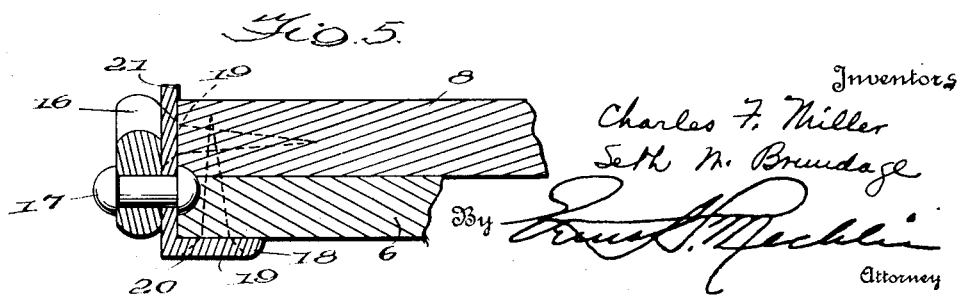
Fig. 5.
Inventors
Charles F. Miller
Seth M. Brundage
By
Attorney Patented Dec. 12, 1933

1,939,310

UNITED STATES PATENT OFFICE 1,939,310

COMBINED AWNING AND SHUTTER

Charles F. Miller and Seth W. Brundage, Miami, Fla.

Application March 23, 1929. Serial No. 349,404

12 Claims. (Cl. 20—59)

Our invention relates to a protective device for a window opening and the like and has for its object the production of means adapted to serve either as a closure or shutter for the opening or as an awning therefor.

A principal feature of the invention consists in providing a protective device for a window opening with upper and lower sections which are adapted to be disposed in substantial vertical alinement when the device serves as a closure for the opening or in overlapping relation when the device serves as an awning therefor, and in combining therewith flexible means attached to the lower section for causing said sections to assume awning position and flexible means attached to the upper section for causing said sections to assume closure position.

A further feature of the invention consists in pivotally mounting on the lower section of the device means for operatively connecting it to the upper section and in providing flexible means secured to the lower section at a point above the pivotal axis of the means connecting the sections for causing them to assume awning position.

A further feature of the invention consists in pivotally mounting on the lower section a pair of links for connecting it to the upper section and in combining with the device flexible means attached to the lower section above the pivotal axis of the links for causing the sections to assume awning position and with flexible means attached to the upper section at a point above the top edge of the lower section when the latter is in awning position for causing the sections to assume closure position.

A still further feature of the invention consists in providing one of the sections of the device with spring means for counterbalancing it, the means involving a plurality of diagonally disposed springs.

Other and more specific features of the invention residing in advantageous forms and combinations of parts will hereinafter appear and be pointed out in the claims.

In the drawings illustrating preferred embodiments of the invention.

Figure 4 is a rear view of the device in closure position detached from the window frame.

Figure 5 is an enlarged detailed fragmentary view on line 5—5, Figure 4.

Figure 6 is an enlarged fragmentary view taken on line 6—6, Figure 4.

Referring more particularly to the drawings 1 indicates the wall of a building having an opening 2 within which is mounted a window frame 3 provided with sashes 4 of any desirable construction.

Figure 2:
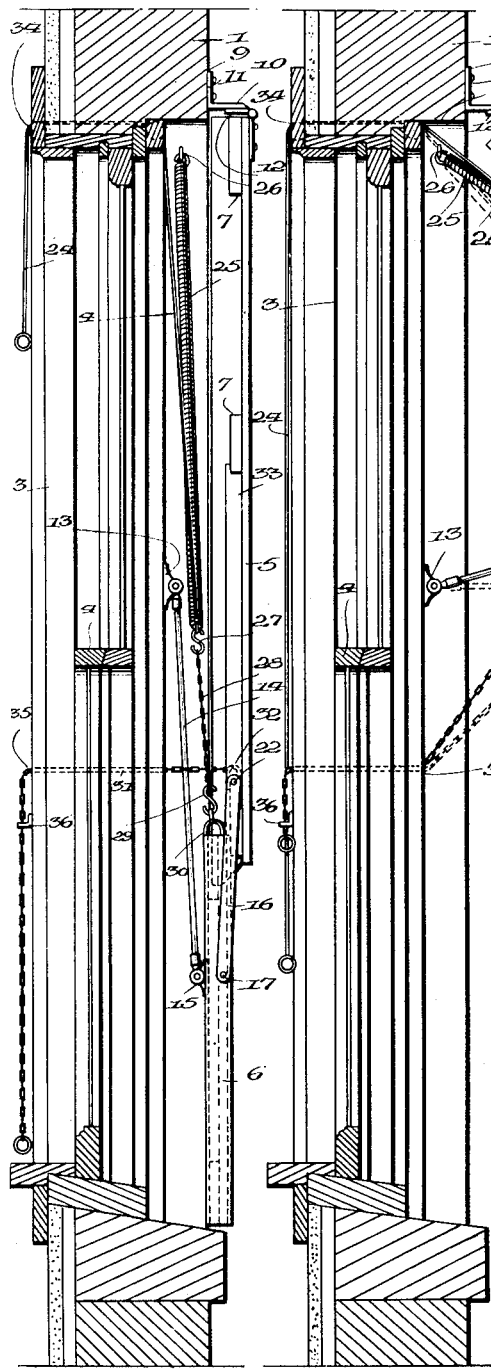
Figure 2 is a vertical sectional view of the device when serving as a closure, the sections thereof being in elevation.
Figure 3:
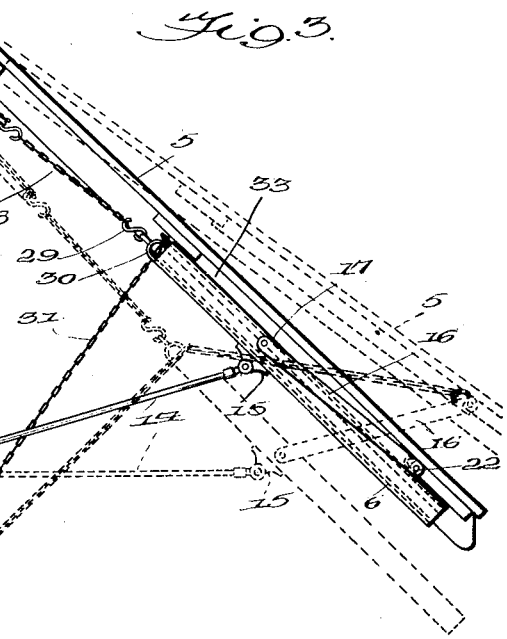
Figure 3 is a view similar to Figure 2 showing the device in awning position.
Figure 7:
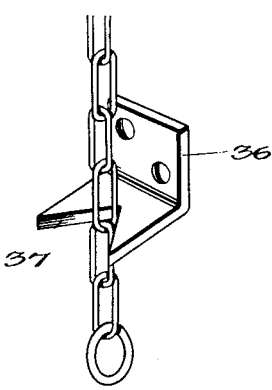
Figure 7 is a detailed perspective view of the means employed for cooperating with one of the flexible operating means.

The protective device for the opening preferably comprises two relatively movable upper and lower sections 5 and 6, respectively, which are adapted to be moved either into substantial vertical alinement, as clearly shown in Figure 2, to act as a closure for the opening or into overlapping relation, as shown in Figure 3 to serve as an awning for the opening. While these sections may be made of any suitable material they are illustrated in the present embodiment of the invention as being made of wood. Each of the sections may be advantageously reinforced by a plurality of transversely extending wooden strips or bars 7 secured to its inner face; and the lower section may be additionally reinforced adjacent its side edges with bars or strips 8.

Disposed above the window opening is an angle iron having flanges 9 and 10, the former being secured to the outer face of the building by attaching means 11 and the latter projecting outwardly therefrom substantially normal thereto. The flange 10 affords a convenient means to which the upper section 5 may be hingedly connected by brackets 12 in such manner that water and the like is prevented from seeping between the upper section and the window opening.

Rigidly secured to the sides of the window frame 3 are brackets 13 which respectively form pivotal supports for arms or links 14, the latter being pivotally connected at their opposite ends to the lower section 5 by brackets 15. Thus when the lower section is moved upwardly from the position indicated in Figure 2 it will be appreciated that the arms 14 cause it to move generally in an arcuate path.

Figure 8:
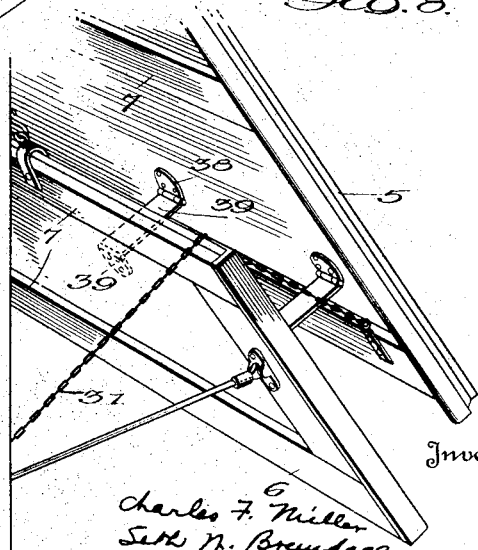
Figure 8 is a fragmentary perspective view showing a modified arrangement for operatively connecting the sections of the device.
Figure 9:
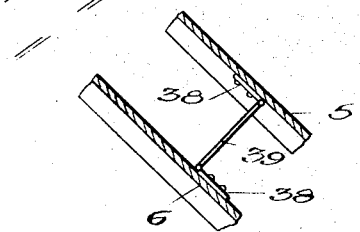
Figure 9 is a fragmentary sectional view of the modified form of connection.

Operatively interposed between the two sections for connecting them are a plurality of arms or links 16 which are respectively pivotally connected by rivets 17 to the lower section at its opposite side edges. To afford a rigid mounting for the pivot rivets 17 and to additionally reinforce the lower section the side edges of the latter are provided with angle irons 18 secured thereto by screws 19. Each of the angle irons has a flange 20 overlapping the outer face of the section and a flange 21 overlapping the adjacent marginal edge thereof through which the associated pivot rivet 17 extends. At their opposite ends the links 16 are pivotally secured to the upper section by rivets 22 which pass through a binding strip 23 secured to the ends of the lower reinforcing bar 7 of the upper section, this bar preferably terminating inwardly of the sides of the main body portion of the section. Instead of connecting the sections by links which are disposed at the side edges thereof they may be conveniently connected by a plurality of arms or links 39 having pivoted extensions 38 adapted to be respectively secured to the inner face of the upper section and outer face of the lower section, as clearly shown in Figures 8 and 9. It will be readily apparent that any number of these connecting members may be employed, the number depending entirely upon the width of the sections.

From the foregoing it will be perceived that should either one of the sections be moved the means connecting the two sections will cause movement of the other. When the lower section is raised from the position indicated in Figure 2 the upper section is caused to rotate upwardly away from the building about the hinge connection through the intermediacy of the means connecting the sections. This action is continued until the connecting means assumes a horizontal position. As the horizontal distance between the opposite ends of the connecting means starts to decrease after the means has passed through the horizontal, the sections of course start to move in opposite directions, that is, while the lower section continues to move upwardly the upper section begins to move downwardly. The dotted lines in Figure 3 indicate the relative positions of the parts just prior to the time the sections are caused to move in opposite directions as they are being moved from closure to awning position. Movement of the sections in opposite directions continues until they are brought into the overlapping relationship illustrated in full lines in Figure 3 in which position they are locked and supported by the rigid arms 14.

For moving the sections from closure to awning position a flexible means 24 is secured to the lower section preferably midway between its side edges. As the lower section is more or less free to rotate about the axes of the various links or arms which are pivotally connected to it the flexible operating means 24 is secured at a point above these pivotal axes so that the force transmitted to the section as it is being raised will tend to prevent its free uncontrolled rotation.

The lower section may also be advantageously provided with means for counterbalancing it to minimize the force required to raise the sections to awning position. The means in the present embodiment of the invention consists of two diagonally disposed preferably coiled springs 25 respectively connected at their upper ends to opposite corners of the window frame by any suitable means such as eye bolts 26. At their lower ends the springs are preferably connected to a hook shaped member 27 which forms a part of a chain 28. The opposite end of this chain has a similarly shaped hook member 29 which cooperates with a bracket 30 secured adjacent the upper edge of the lower section. The chain 28 and the hooks 27 and 29 constitute a part of the flexible operating means 24. The springs employed are tension springs and even when the lower section is in awning position the springs are under slight tension so as to prevent the upper edge of the lower section from swinging downwardly. By arranging the springs diagonally it will be appreciated that they will be distorted a less amount when the sections are moved from awning to closure position than would be the case if they were secured to the lower section so as to operate in a plane substantially normal to the hinge axes of the sections. It follows, therefore, that in dealing with springs of the same capacity, if springs which are arranged diagonally with respect to the hinge axis of the lower section exert on that section a force of the same magnitude as would be exerted by springs which are arranged normal to the axis of the section, the diagonally arranged springs will exert a greater force on the section when it is in awning position than would be exerted by the normally arranged springs. Moreover, due to the fact that the distortion of the diagonally arranged springs will be less than the distortion of the normally arranged springs when the section is moved from one position to another, springs of greater capacity may be used when arranged diagonally.

Additional means is preferably employed for causing the sections to move from awning to closure position. This means may consist of two chains 31 which are respectively secured to the upper section by brackets 32 at a point below the top edge of the lower section when the latter is in awning position, the point of attachment preferably being adjacent the lower edge of the upper section. The chains 31 are also secured to the upper section at a point inwardly of the side edges of the lower section so that when the sections move to awning position the chains will be carried upwardly by contacting with the top edge of the lower section and when the sections are in awning position portions of the chains are interposed between them.

Figure 1:
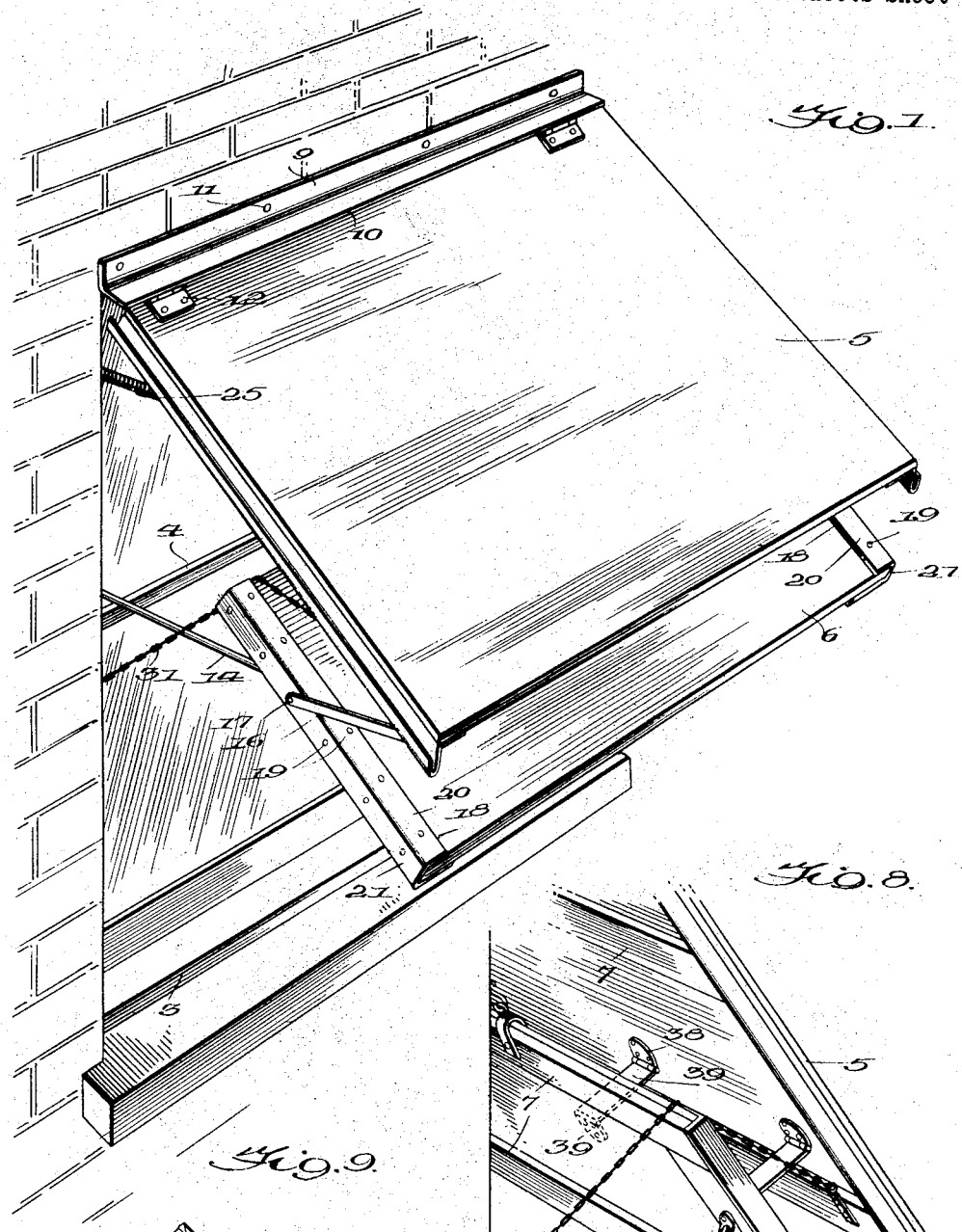
Figure 1 is a perspective view of the device, the sections thereof being shown in an intermediate position.

Secured to the inner face of the upper section adjacent its side edges and outwardly of the points to which the chains 31 are attached are strips or bars 33 which project slightly beyond the strips or bars 7 so that the sections will be spaced slightly apart when in awning position to permit of free operation of the chains 31. It will be readily perceived that when the sections are in awning position a downward pull on the chains 31 will induce a corresponding movement of the lower section 6 and an upward movement of the upper section 5. These movements of the sections will continue until the links connecting them pass through the horizontal and then both of the sections will gravitate to closure position. The inner ends of the flexible operating means 24 and 31 preferably extend within the building to which the device is applied so that it may be conveniently operated therefrom. The flexible operating means 24 may conveniently extend within the building at a point adjacent the top edge of the window frame and a plurality of pulleys 34 are provided to cooperate with the means during its travel through the frame. The operating means 31 extends into the building at a point preferably somewhat below the top edge of the lower section when the latter is in awning position so that an inward pull on that portion of the means within the building will cause a downward movement of the lower section. The window frame may be advantageously provided with metal tubes 35 through which the flexible operating means 31 may extend and angular brackets 36 having notches 37 are preferably secured to the inside of the window frame below the tubes 35 for cooperating with the links of chain 31 to secure the device in shutter or closure position. Thus the chains 31 not only serve as means for moving the device from awning to shutter position but they also serve as effective means for locking the device in shutter position. It will, of course, be appreciated that while the sections are primarily intended to be used either in a fully closed or fully opened position as represented in full lines in Figures 2 and 3 they may also be supported in any intermediate position of adjustment by securing the operating means 24 to any suitable means, not shown. In Figure 1 the sections are shown in one of the many positions of adjustment that they may assume and it will be observed from this figure that the bottom edge of the upper section is below the top edge of the lower section thereby permitting free passage of air but obstructing the direct passage of light.

From the foregoing it will be apparent that the device is simple and inexpensively constructed, may be easily and conveniently operated and installed and will efficiently perform its intended functions.

We claim:

1. A protective device for a window opening involving upper and lower sections movable into substantial vertical alinement to serve as a closure for the opening and into overlapping relation to serve as an awning therefor, rigid means rotatably mounted adjacent the sides of the opening for cooperating with said sections to maintain them in awning position, flexible means attached to the lower section for causing said sections to assume awning position, and flexible means attached to the upper section and cooperable with the lower section to displace the latter from awning position for permitting said sections to assume closure position.

2. A protective device for a window opening involving upper and lower sections movable into substantial vertical alinement to serve as a closure for the opening and into overlapping relation to serve as an awning therefor, said upper section being hingedly mounted adjacent the top of the window opening, link means pivotally associating the lower section with the opening and adapted to maintain the sections in awning position, means operatively interposed between the sections for pivotally connecting them, flexible means attached to the lower section for moving the sections into awning position, and flexible means attached to the upper section at a point below the top edge of the lower section when the latter is in awning position for moving the sections into closure position.

3. A protective device for a window opening involving upper and lower sections movable into substantial vertical alinement to serve as a closure for the opening and into overlapping relation to serve as an awning therefor, means pivotally attached to the lower section intermediate its ends for connecting it with the upper section, link means pivotally associating the lower section with the opening, flexible means attached to one of said sections for moving them into awning position, and flexible means attached to the other of said sections for moving them into closure position.

4. A protective device for a window opening involving upper and lower sections movable into substantial vertical alinement to serve as a closure for the opening and into overlapping relation to serve as an awning therefor, said upper section being hingedly mounted adjacent the top of the window opening, means pivotally attached to the lower section intermediate its ends for connecting it with the upper section, link means pivotally associating the lower section with the opening, flexible means attached to the upper section adjacent its bottom edge for moving the sections into closure position.

5. A protective device for a window opening involving upper and lower sections movable into substantial vertical alinement to serve as a closure for the opening and into overlapping relation to serve as an awning therefor, link means pivotally associating the lower section with the opening, flexible means attached to the lower section for causing said sections to assume awning position, flexible means attached to the upper section for causing the sections to assume closure position, and means operatively interposed between the sections for causing the outer face of the lower section to be brought into contiguous relation with the inner face of the upper section when the sections are moved to awning position.

6. A protective device for a window opening involving upper and lower sections movable into substantial vertical alinement to serve as a closure for the opening and into overlapping relation to serve as an awning therefor, link means pivotally associating the lower section with the opening, means pivotally mounted on the lower section for operatively connecting the sections, and flexible means secured to the lower section at a point above the pivotal axis of the connecting means for causing the sections to assume awning position.

7. A protective device for a window opening involving upper and lower sections movable into substantial vertical alinement to serve as a closure for the opening and into overlapping relation to serve as an awning therefor, the upper section being hingedly mounted adjacent the top of the opening, link means pivotally associating the lower section with the opening, means pivotally mounted on the lower section for operatively connecting the sections, flexible means secured to the lower section at a point above the pivotal axis of the said connecting means for causing the sections to assume awning position, and flexible means secured to the upper section for causing the sections to assume closure position.

8. A protective device for a window opening involving upper and lower sections movable into substantial vertical alinement to serve as a closure for the opening and into overlapping relation to serve as an awning therefor, means pivotally associating the lower section with the opening, a pair of links pivotally secured to the lower section for connecting it to the upper section, flexible means secured to the lower section above the pivotal axis of the links for causing the sections to assume awning position, and flexible means secured to the upper section for causing the sections to assume closure position.

9. A protective device for a window opening involving upper and lower sections movable into substantial vertical alinement to serve as a closure for the opening and into overlapping relation to serve as an awning therefor, the upper section being hingedly mounted adjacent the top of the opening, means pivotally associating the lower section with the opening, a pair of links pivotally secured to the lower section for connecting it to the upper section, flexible means attached to the lower section above the pivotal axis of the links for causing the sections to assume awning position, and flexible means attached to the upper section at a point below the top edge of the lower section when the latter is in awning position for causing the sections to assume closure position.

10. A protective device for a window opening adapted to serve selectively as an awning and as a shutter, said device involving an upper section and a lower section, said upper section being adapted to be hingedly mounted adjacent the top of the window opening, rigid means connecting said upper and lower sections, said rigid means being pivotally connected to each of said sections so that said lower section is movable as a whole lengthwise of said upper section to a position between the latter and the window opening, arm means adapted to be pivotally mounted adjacent the sides of the window opening for supporting the device in awning position, and flexible means independent of said rigid means secured to the upper section and operable when the device is in awning position to induce relative movement of said sections for causing the device to assume shutter position.

11. A protective device for a window opening adapted to serve selectively as an awning and as a shutter, said device involving an upper section and a lower section, said sections being adapted to be respectively disposed in substantially vertical alinement when the device is in shutter position and in inclined positions when the device is in awning position, said upper section being adapted to be hingedly mounted adjacent the top of the window opening and said lower section being movable as a whole lengthwise of said upper section so as to be disposed beneath the upper section in lapping relation therewith when the latter is in awning position, arm means pivotally mounted adjacent the sides of the window opening and pivotally connected to said lower section for supporting the device in awning position, and flexible means secured to one of said sections and operable when the device is in awning position to induce pivotal movement of said lower section with respect to said arm means for causing the device to assume shutter position, said flexible means also constituting means for securing said device in shutter position.

12. A protective device for a window opening adapted to serve selectively as a shutter and as an awning, said device involving an upper section and a lower section, said lower section being adapted to be disposed in substantially vertical alinement with the upper section when the device serves as a shutter and being adapted to be disposed between the upper section and the window opening when the device serves as an awning, rigid means pivotally connected to each of said sections adapted to permit the upper edge of the lower section to move toward and away from the upper edge of the upper section, operating means secured to said lower section adjacent the upper edge thereof for moving the device from shutter to awning position, arm means for supporting said device in awning position, and flexible means independent of said operating means secured to one of said sections and operable when the device is in awning position to induce relative movement of said sections for causing the device to assume shutter position.

CHARLES F. MILLER.
SETH W. BRUNDAGE.